(12) United States Patent
Jo

(10) Patent No.: US 12,380,044 B2
(45) Date of Patent: Aug. 5, 2025

(54) SEMICONDUCTOR DEVICE, BUS CONTROL CIRCUIT AND BUS CONTROL METHOD

(71) Applicant: RENESAS ELECTRONICS CORPORATION, Tokyo (JP)

(72) Inventor: Keisuke Jo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 46 days.

(21) Appl. No.: 18/468,032

(22) Filed: Sep. 15, 2023

(65) Prior Publication Data
US 2024/0126710 A1    Apr. 18, 2024

(30) Foreign Application Priority Data

Oct. 17, 2022    (JP) .................................. 2022-166499

(51) Int. Cl.
*G06F 13/372*    (2006.01)
(52) U.S. Cl.
CPC .................................. *G06F 13/372* (2013.01)
(58) Field of Classification Search
CPC ............... G06F 13/362; G06F 13/1605; G06F 13/1663; G06F 13/364; G06F 13/372
See application file for complete search history.

(56) References Cited

U.S. PATENT DOCUMENTS

| | | | | |
|---|---|---|---|---|
| 2004/0010646 A1* | 1/2004 | Kim | ...................... | G06F 13/364 710/116 |
| 2007/0136503 A1* | 6/2007 | Worrell | ............... | G06F 13/1605 710/240 |
| 2012/0239873 A1* | 9/2012 | Huang | ................ | G06F 13/1626 711/E12.001 |
| 2013/0268706 A1* | 10/2013 | Yun | ..................... | G06F 13/4022 710/110 |
| 2014/0208071 A1* | 7/2014 | Jeong | .................. | G06F 15/7807 712/31 |
| 2019/0108143 A1* | 4/2019 | Smith | ................. | G06F 13/1673 |

OTHER PUBLICATIONS

"ARM CoreLink QoS-400 Network Interconnect Advanced Quality of Service" Revision:r1p0, 2016.

\* cited by examiner

*Primary Examiner* — Phong H Dang
(74) *Attorney, Agent, or Firm* — Rimon P.C.

(57) ABSTRACT

A semiconductor device includes a bus control circuit that controls access to a slave shared by a plurality of masters. The bus control circuit includes a plurality of priority determination circuits corresponding to the plurality of masters. The priority determination circuit is configured to, when receiving an urgent access from a corresponding master, change a priority level signal included in an access request from the corresponding master to allocate a high priority level for emergency and allocate a low priority level to a master other than the corresponding master.

8 Claims, 15 Drawing Sheets

SEMICONDUCTOR DEVICE, BUS CONTROL CIRCUIT AND BUS CONTROL METHOD

CROSS-REFERENCE TO RELATED APPLICATIONS

The disclosure of Japanese Patent Application No. 2022-166499 filed on Oct. 17, 2022 including the specification, drawings and abstract is incorporated herein by reference in its entirety.

BACKGROUND

The present disclosure relates to a semiconductor device, and is applicable to, for example, a semiconductor device including a plurality of bus masters.

There is disclosed a technique listed below.
[Non-Patent Document 1] ARM (registered trademark) CoreLink QoS-400 Network Interconnect Advanced Quality of Service In a semiconductor device such as a micro controller unit (MCU), a bus system in which a plurality of bus masters is connected to a common bus is used. The bus master is, for example, a central processing unit (CPU), a direct memory access controller (DMAC), or the like. In such a bus system, it is necessary to arbitrate requests from the plurality of bus masters to the common bus. Non-Patent Document 1 discloses an example of a technique for performing arbitration on the basis of quality of service (QoS) information regarding priority. Hereinafter, the bus master is simply referred to as a master.

SUMMARY

Due to factors such as an increase in the number of masters, the band may be limited or the priority may be lowered even in urgent processing (for example, error processing). Therefore, there is a possibility that urgent processing is not completed within a predetermined time.

Other problems and novel features of the present disclosure will become apparent from the description of the present specification and the accompanying drawings.

An outline of representative ones of the present disclosure will be briefly described below. That is, a semiconductor device includes a bus control circuit that controls access to a slave shared by a plurality of masters. The bus control circuit includes a plurality of priority determination circuits corresponding to the plurality of masters. The priority determination circuit is configured to, when receiving an urgent access from a corresponding master, change a priority level signal included in an access request from the corresponding master to allocate a high priority level for emergency and allocate a low priority level to a master other than the corresponding master.

With the semiconductor device described above, it is possible to improve responsiveness of urgent processing.

DETAILED DESCRIPTION

Hereinafter, an embodiment and a modification will be described with reference to the drawings. However, in the following description, the same components are denoted by the same reference signs, and repeated description may be omitted.

Figure 1:
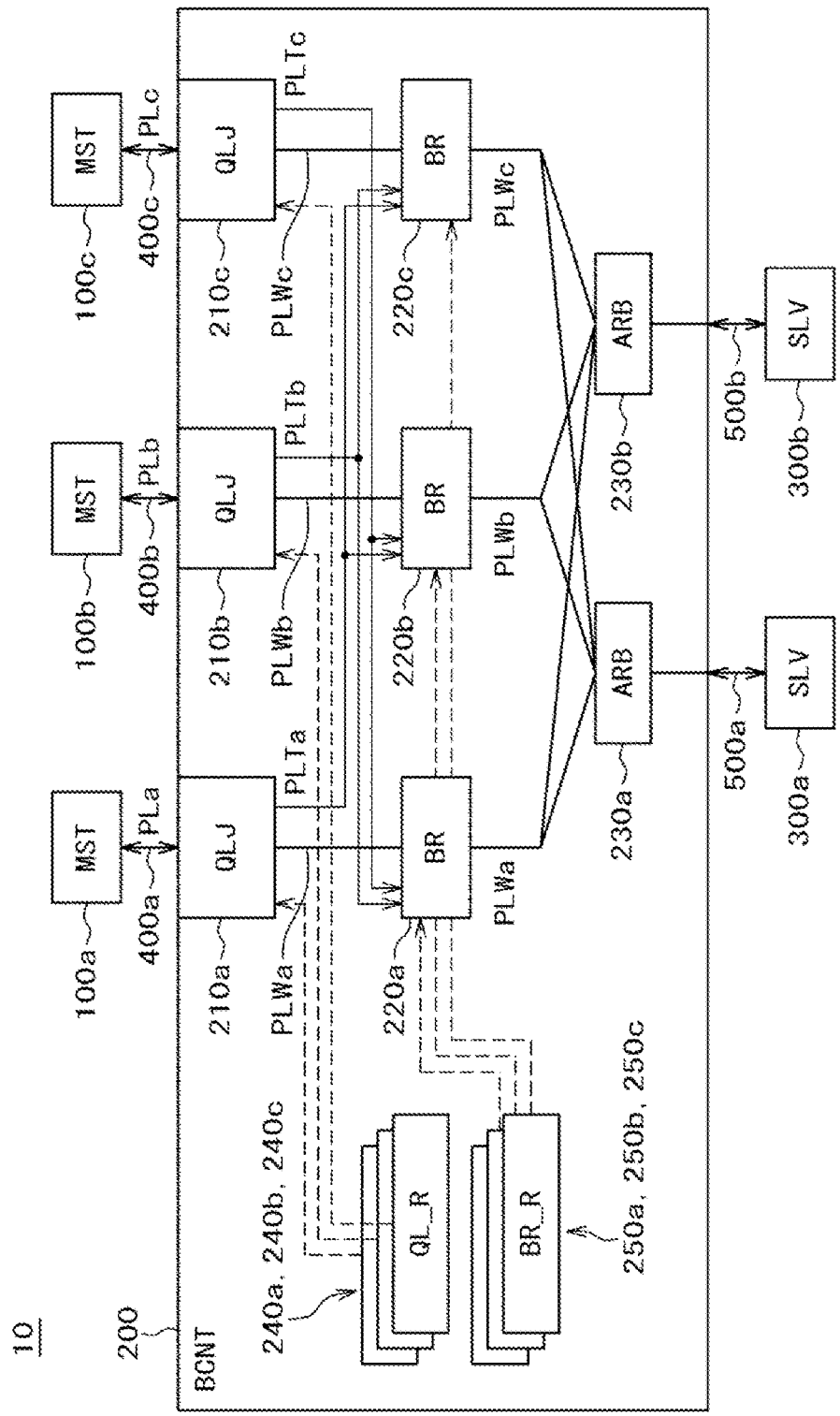
FIG. 1 is a schematic block diagram illustrating a configuration of a semiconductor device according to an embodiment.

A semiconductor device according to an embodiment will be described with reference to FIG. 1. FIG. 1 is a schematic block diagram illustrating a configuration of a semiconductor device according to an embodiment.

A semiconductor device 10 according to the embodiment includes a plurality of masters (MST) 100a, 100b, and 100c, a bus control circuit (BCNT) 200, slaves (SLV) 300a and 300b, buses 400a, 400b, and 400c, and buses 500a and 500b.

Here, the masters 100a, 100b, and 100c may be collectively referred to as a master 100, and the slaves 300a and 300b may be collectively referred to as a slave 300. The buses 400a, 400b, and 400c may be collectively referred to as a bus 400, and the buses 500a and 500b may be collectively referred to as a bus 500. Note that, in the example illustrated in FIG. 1, the number of the masters 100 is three, but the number of the masters 100 may be any number as long as it is two or more. In addition, although the number of the slaves 300 is two, the number of the slaves 300 may be any number as long as it is one or more.

The master 100 is, for example, a CPU, a DMAC, a graphics processing unit (GPU), or the like. The slave 300 is, for example, flash memory, SRAM, a memory controller, a peripheral circuit, or the like. The semiconductor device 10 is, for example, an MCU. The semiconductor device 10 is formed on one or a plurality of semiconductor substrates. The semiconductor substrate is, for example, a silicon substrate. In a case where the semiconductor device 10 includes a memory controller, for example, memory such as double data rate synchronous dynamic random access memory (DDR SDRAM) is connected to the outside of the semiconductor device 10 to constitute an electronic device.

The plurality of masters 100*a*, 100*b*, and 100*c* is connected to the bus control circuit 200 via the buses 400*a*, 400*b*, and 400*c*, respectively. The plurality of masters 100*a*, 100*b*, and 100*c* outputs requests (access requests) for the slaves 300*a* and 300*b* to the bus control circuit 200 via the buses 400*a*, 400*b*, and 400*c*, respectively.

The bus control circuit 200 is also called an interconnect, and controls access from the plurality of masters 100*a*, 100*b*, and 100*c* to the shared slaves 300*a* and 300*b*.

The response (access result: read data, sideband signal, or the like) to the slaves 300*a* and 300*b* is transmitted to the masters 100*a*, 100*b*, and 100*c* via the buses 500*a* and 500*b*, the bus control circuit 200, and the buses 400*a*, 400*b*, and 400*c*.

The bus control circuit 200 includes priority determination circuits (QLJ) 210*a*, 210*b*, and 210*c*, band adjustment circuits (BR) 220*a*, 220*b*, and 220*c*, bus arbitration circuits (ARB) 230*a* and 230*b*, priority control registers (QL_R) 240*a*, 240*b*, and 240*c*, and band control registers (BR_R) 250*a*, 250*b*, and 250*c*.

The priority determination circuits 210*a*, 210*b*, and 210*c* are connected to the buses 400*a*, 400*b*, and 400*c*, respectively. The operation of the priority determination circuits 210*a*, 210*b*, and 210*c* is controlled by the priority control registers 240*a*, 240*b*, and 240*c*, respectively. Since the configurations of the priority determination circuits 210*a*, 210*b*, and 210*c* are similar to each other, the priority determination circuits 210*a*, 210*b*, and 210*c* may be collectively referred to as a priority determination circuit 210.

The band adjustment circuits 220*a*, 220*b*, and 220*c* are connected to the priority determination circuits 210*a*, 210*b*, and 210*c*. The operation of the band adjustment circuits 220*a*, 220*b*, and 220*c* is controlled by the band control registers 250*a*, 250*b*, and 250*c*, respectively. Since the configurations of the band adjustment circuits 220*a*, 220*b*, and 220*c* are similar to each other, the band adjustment circuits 220*a*, 220*b*, and 220*c* may be collectively referred to as a band adjustment circuit 220.

The bus arbitration circuits 230*a* and 230*b* are connected to the priority determination circuits 210*a*, 210*b*, and 210*c*. The bus arbitration circuits 230*a* and 230*b* are connected to the buses 500*a* and 500*b*, respectively. Since the configurations of the bus arbitration circuits 230*a* and 230*b* are similar to each other, the bus arbitration circuits 230*a* and 230*b* may be collectively referred to as a bus arbitration circuit 230.

Since the configurations of the priority control registers 240*a*, 240*b*, and 240*c* are similar to each other, the priority control registers 240*a*, 240*b*, and 240*c* may be collectively referred to as a priority control register 240. The priority control register 240 is set by the master 100.

Since the configurations of the band control registers 250*a*, 250*b*, and 250*c* are similar to each other, the band control registers 250*a*, 250*b*, and 250*c* may be collectively referred to as a band control register 250. The band control register 250 is set by the master 100.

The priority determination circuit 210 receives an access request through the bus 400. The access request includes an address signal (AD) and a priority level signal (PL). The priority level signal (PL) is a signal indicating a priority level based on QoS information of the master 100 or the like. The higher the priority level value, the higher the priority, and the priority level value=0 is not a target of priority control.

When receiving an urgent access request from the master 100*a*, the priority determination circuit 210*a* changes the priority level signal (PLa) from the master 100*a* connected to the bus 400*a*. The priority determination circuit 210*a* outputs the changed priority level signal (PLWa) to the band adjustment circuit 220*a* and the bus arbitration circuit 230*a* in order to allocate a high priority level for emergency to the master 100*a*, which is an own master. In this case, the priority determination circuit 210*a* outputs a priority level signal (PLTa) to the band adjustment circuits 220*b* and 220*c* in order to allocate a priority level lower than that of the master 100*a* to the masters 100*b* and 100*c*, which are other masters.

When receiving an urgent access request from the master 100*b*, the priority determination circuit 210*b* changes the priority level signal (PLb) from the master 100*b* connected to the bus 400*b*. The priority determination circuit 210*b* outputs the changed priority level signal (PLWb) to the band adjustment circuit 220*b* and the bus arbitration circuit 230*b* in order to allocate a high priority level for emergency to the master 100*b*, which is an own master. In this case, the priority determination circuit 210*b* outputs a priority level signal (PLTb) to the band adjustment circuits 220*a* and 220*c* in order to allocate a priority level lower than that of the master 100*b* to the masters 100*a* and 100*c*, which are other masters. When receiving an urgent access request from the master 100*c*, the priority determination circuit 210*c* changes the priority level signal (PLc) from the master 100*c* connected to the bus 400*c*. The priority determination circuit 210*c* outputs the changed priority level signal (PLWc) to the band adjustment circuit 220*c* and the bus arbitration circuit 230*c* in order to allocate a high priority level for emergency to the master 100*c*, which is an own master. In this case, the priority determination circuit 210*c* outputs a priority level signal (PLTc) to the band adjustment circuits 220*a* and 220*b* in order to allocate a priority level lower than that of the master 100*c* to the masters 100*a* and 100*b*, which are other masters.

The band adjustment circuit 220 controls the bus band to be allocated to the access request from the master 100 on the basis of the priority level signals input from the plurality of priority determination circuits 210.

The band adjustment circuit 220*a* controls the bus band to be allocated to the access request from the master 100*a* on the basis of the priority level signal (PLWa), the priority level signal (PLTb), and the priority level signal (PLTc). The band adjustment circuit 220*b* controls the bus band to be allocated to the access request from the master 100*b* on the basis of the priority level signal (PLWb), the priority level signal (PLTa), and the priority level signal (PLTc). The band adjustment circuit 220*c* controls the bus band to be allocated to the access request from the master 100*c* on the basis of the priority level signal (PLWc), the priority level signal (PLTa), and the priority level signal (PLTb).

The priority level signals given to the access requests from the plurality of masters 100 to the slave 300 are changed by the priority determination circuit 210, and the bus arbitration circuit 230 arbitrates the priority order of each access request on the basis of the changed priority level signals.

The bus arbitration circuit 230*a* arbitrates the priority order of the access requests from the masters 100*a*, 100*b*, and 100*c* to the slave 300*a* on the basis of the priority level signal (PLWa), the priority level signal (PLWb), and the priority level signal (PLWc). The bus arbitration circuit 230*b* arbitrates the priority order of the access requests from the masters 100*a*, 100*b*, and 100*c* to the slave 300*b* on the basis of the priority level signal (PLWa), the priority level signal (PLWb), and the priority level signal (PLWc).

The priority control register 240 stores control information for the priority determination circuit 210. The band control register 250 stores control information for the band adjustment circuit 220.

Figure 2:
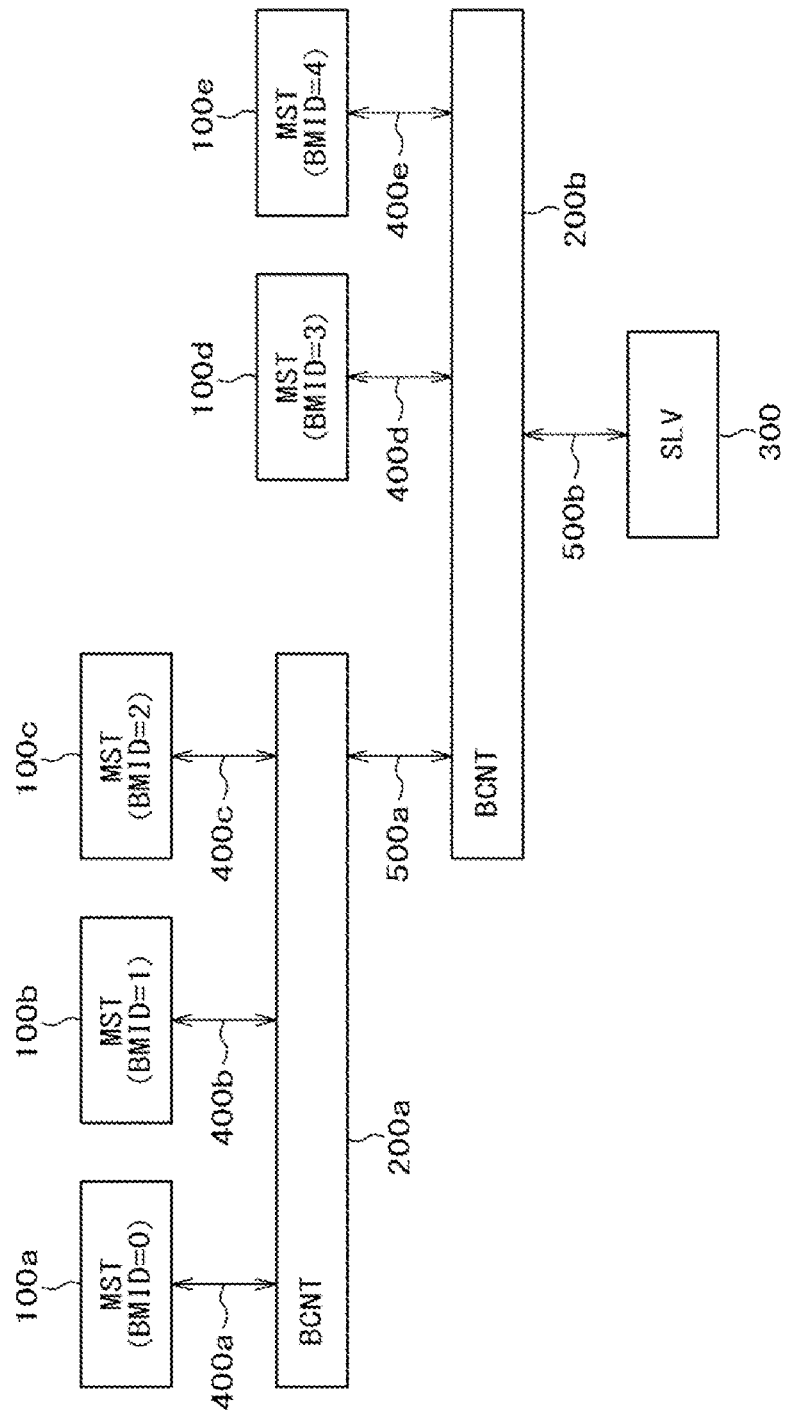
FIG. 2 is a block diagram illustrating bus control circuits connected in multiple stages.

Note that depending on the bus configuration, a sideband signal (SB) may be required. This bus configuration will be described with reference to FIG. 2. FIG. 2 is a block diagram illustrating bus control circuits connected in multiple stages. The masters 100a, 100b, and 100c are connected to a bus control circuit 200a via the buses 400a, 400b, and 400c, respectively. The bus control circuit 200a and masters 100d and 100e are connected to a bus control circuit 200b via buses 500a, 400d, and 400e, respectively. The masters 100a, 100b, and 100c output access requests for the slave 300 to the bus control circuit 200b via the buses 400a, 400b, and 400c, the bus control circuit 200a, and the bus 500a.

In such a bus configuration, it may be necessary to identify a specific master among the plurality of masters 100a, 100b, and 100c that accesses via the bus 500a. Therefore, identification information (BMID) of a master for identifying a specific master from among a plurality of masters is included in the sideband signal (SB). In other words, in bus control circuits connected in multiple stages, when access requests from a plurality of masters are input, identification information (BMID) of a sideband signal (SB) is used to identify a specific master from among the plurality of masters. In the example illustrated in FIG. 2, 0 to 4 are allocated as the BMID to the masters 100a to 100e, respectively. Here, the sideband signal (SB) is a signal transmitted in association with the request.

The description will be given with reference to FIG. 1 again. The bus control circuit 200 can perform band control with the priority determination circuit 210 and the band adjustment circuit 220, perform priority control with the priority determination circuit 210 and the bus arbitration circuit 230, and perform both band control and priority control. The band control is a control method directed to a bus system in which a master occupying a band is present. The priority control is a control method directed to a bus system in which access requests from a large number of masters are concentrated on a specific slave.

The priority determination circuit 210 determines a priority level value on the basis of an address signal (AD) of an access request from the master 100 to the slave 300, identification information (BMID) included in a sideband signal (SB), and the like. The priority determination circuit 210 overwrites the priority level value of the priority level signal (PL) included in the access request with the determined priority level value. Thus, the priority level is temporarily increased or decreased.

On the basis of the priority level from the priority determination circuit 210, the band adjustment circuit 220 performs band control (relaxation) to expand the band of the own master or band control (enhancement) to narrow the band of other masters during the access by the master 100. The bus arbitration circuit 230 performs arbitration on the basis of the priority level from the priority determination circuit 210.

In this manner, the bus control circuit 200 can quickly shift to an emergency-time priority level (E-QoS) by relatively expanding the band of the own master or increasing the priority level.

Figure 3:
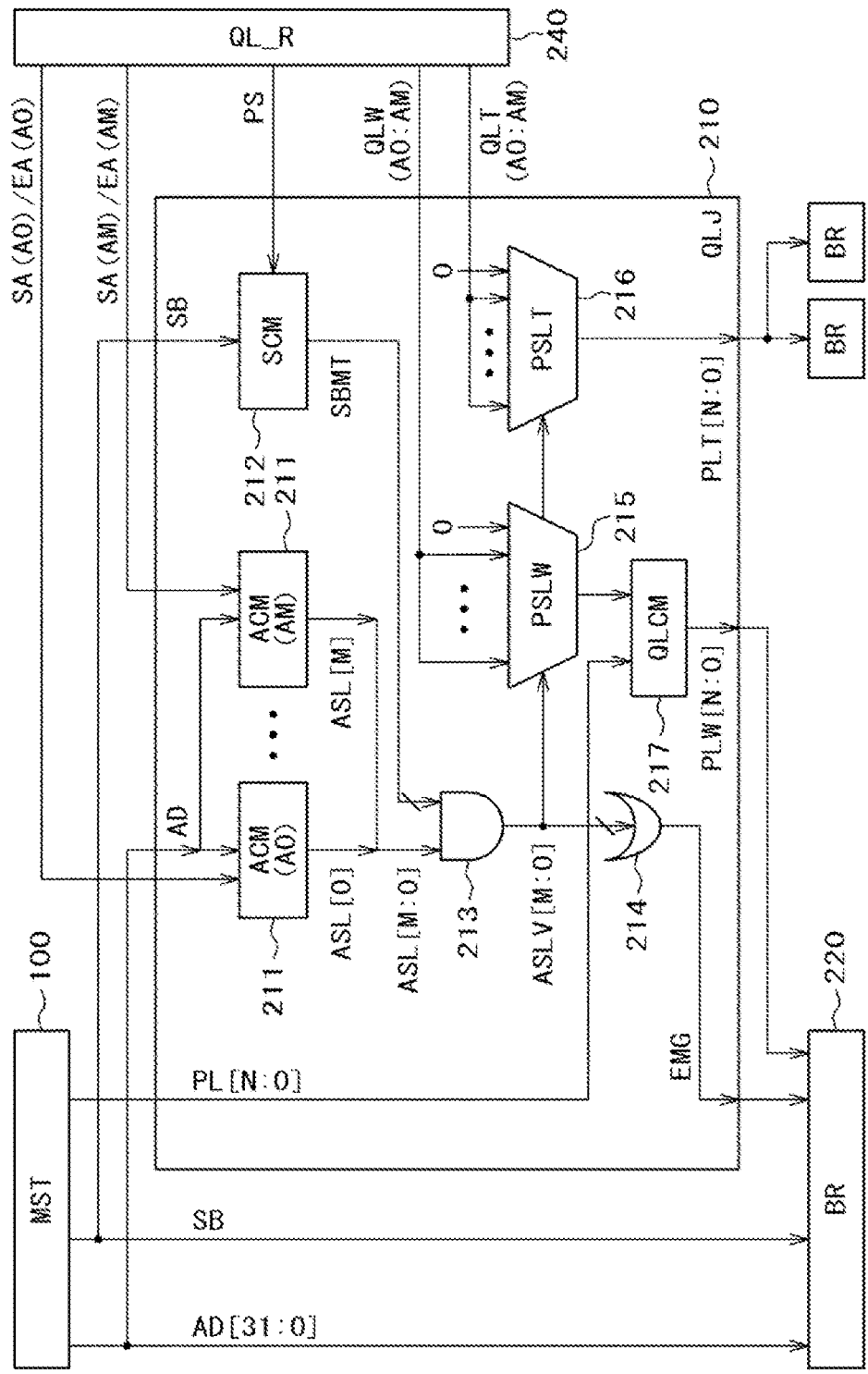
FIG. 3 is a block diagram illustrating a first configuration example of a priority determination circuit and its periphery illustrated in FIG. 1.
Figure 4:
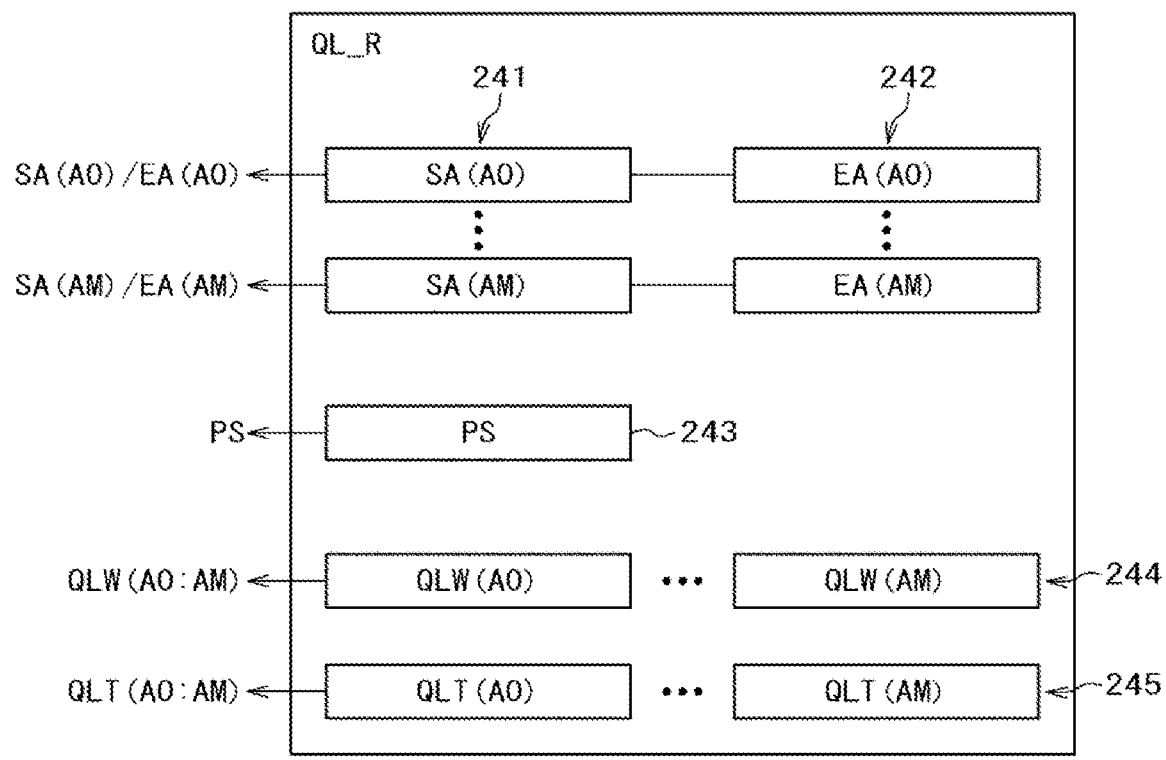
FIG. 4 is a diagram illustrating a first configuration example of a priority control register illustrated in FIG. 1.

Next, a configuration example of the priority determination circuit 210 will be described with reference to FIGS. 3 and 4. FIG. 3 is a block diagram illustrating a configuration example of the priority determination circuit and its periphery illustrated in FIG. 1. FIG. 4 is a diagram illustrating a configuration example of the priority control register illustrated in FIG. 1.

In the priority determination circuit 210 of the present configuration example, an urgent access request is determined by access to an address area designated by a start address and an end address. In addition, as illustrated in FIG. 2, when there is an interface (bus 500a) to which access requests of the plurality of masters are input, the priority determination circuit 210 of the present configuration example is configured to receive identification information (BMID) included in the access requests and identify an access request of a specific master among the plurality of masters.

The priority determination circuit 210 determines an area (high priority level area (HQLA)) having a high priority level from the address signal (AD) and the sideband signal (SB), and sets (updates) the priority level for each high priority level area (HQLA). Here, a priority level signal (PL[N:0]) is a (N+1)-bit signal. N is an integer of 1 or more. That is, the priority level is from 0 to ($2^{N+1}-1$). The priority level signal (PL[N:0]) is the priority level signal (PLa, PLb, PLc) in FIG. 1.

As illustrated in FIG. 3, the priority determination circuit 210 includes (M+1) comparison circuits (ACM) 211, a comparison circuit (SCM) 212, (M+1) AND circuits 213, a selector (PSLW) 215, an OR circuit 214, a selector (PSLT) 216, and a comparison circuit (QLCM) 217. Here, M is an integer of 1 or more.

As illustrated in FIG. 4, the priority control register 240 includes (M+1) sets of a start address register (SA) 241 and an end address register (EA) 242, a sideband register (PS) 243, (M+1) own master priority level registers (QLW) 244, and (M+1) other master priority level registers (QLT) 245.

Among the areas accessed by the master 100, (M+1) high priority level areas (HQLA) can be set, and these high priority level areas (HQLA) are set as areas (A0 to AM). For example, the start address register (SA(A0)) 241 is a start address register for the area (A0), and stores an address indicating the head of the area (A0). The end address register (EA(A0)) 242 is an end address register for the area (A0), and stores an address indicating the end of the area (A0). The address range of the area (A0) is set by the start address register 241 and the end address register 242 for the area (A0). Similarly, the address range of the area (AM) is set by the start address register 241 and the end address register 242 for the area (AM).

The sideband register 243 is a register for setting a specific master, and identification information (BMID) is set.

The own master priority level register (QLW(A0)) 244 is a priority level register for the area (A0), and the priority level of the area (A0) is set. The own master priority level register (QLW(AM)) 244 is a priority level register for the area (AM), and the priority level of the area (AM) is set.

The other master priority level register (QLT(A0)) 245 is a priority level register for the area (A0), and the priority level of the area (A0) is set. The other master priority level register (QLT(AM)) 245 is a priority level register for the area (AM), and the priority level of the area (AM) is set.

The (M+1) comparison circuits 211 determine whether the address signal (AD) is included in the high priority level area (HQLA). The comparison circuit (ACM(A0)) 211 for the area (A0) determines whether the address signal (AD) is included in the area (A0). The comparison circuit (ACM (AM)) 211 for the area (AM) determines whether the address signal (AD) is included in the area (AM).

The comparison circuit 211 for the area (A0) compares the address signal (AD) with the addresses stored in the start address register 241 and the end address register 242 for the area (A0). When the address signal (AD) is included in the area (A0), the comparison circuit 211 for the area (A0) sets an area selection signal (ASL[0]) to the high level.

The comparison circuit 211 for the area (AM) compares the address signal (AD) with the addresses stored in the start address register 241 and the end address register 242 for the area (AM). When the address signal (AD) is included in the area (AM), the comparison circuit 211 for the area (AM) sets an area selection signal (ASL[M]) to the high level.

The area selection signal (ASL[0]) to the area selection signal (ASL[M]) are collectively referred to as an area selection signal (ASL[M:0]). That is, the area selection signal (ASL[M:0]) is a (M+1)-bit signal.

The comparison circuit 212 determines whether the master 100 is a specific master. The comparison circuit 212 compares the identification information (BMID) included in the sideband signal (SB) with the identification information (BMID) stored in the sideband register 243, and when the identification information matches the identification information, for example, sets a match signal (SBMT) to the high level.

The AND circuit 213 performs logical conjunction of each area selection signal (ASL[M:0]) and the match signal (SBMT) and outputs (M+1)-bit area selection valid signals (ASLV[M:0]). In a case where the match signal (SBMT) is at the high level, when any of the area selection signals (ASL[M:0]) is at the high level, any of the area selection valid signals (ASLV[M:0]) is at the high level.

The OR circuit 214 performs logical disjunction of the (M+1)-bit area selection valid signals (ASLV[M:0]). The OR circuit 214 outputs the high level when any of the area selection valid signals (ASLV[M:0]) is at the high level. When a specific master accesses the high priority level area (HQLA), an emergency signal (EMG) goes to the high level. The emergency signal (EMG) goes to the high level when the address signal (AD) is in the high priority level area (HQLA), and indicates that the priority level signal (PL[N:0] is at the emergency-time priority level (E-QoS). When the emergency signal (EMG) is at the low level, it indicates that the priority level signal (PL[N:0]) is at a normal-time priority level (N-QoS).

The selector 215 selects the priority level stored in the own master priority level registers (QLW (AM) to QLW (A0)) 244 according to the area selection valid signals (ASLV[M:0]). When all the area selection valid signals (ASLV[M:0]) are at the low level, "0" is selected.

The selector 216 selects the priority level stored in the other master priority level registers (QLT(AM) to QLT(A0)) 245 according to the area selection valid signals (ASLV[M:0]) and outputs the priority level as the other master priority level signal (PLT[N:0]). When all the area selection valid signals (ASLV[M:0]) are at the low level, "0" is selected. That is, when the address signal (AD) is not in the high priority level area (HQLA), PLT[N:0] becomes 0. Here, the priority level signal (PLT[N:0]) is the priority level signal (PLTa, PLTb, PLTc) in FIG. 1.

The comparison circuit 217 compares the priority level indicated by the priority level signal (PL[N:0]) with the priority level that is the output of the selector 215, and outputs the higher priority level as the own master priority level signal (PLW[N:0]). Here, the priority level signal (PLW[N:0]) is the priority level signal (PLWa, PLWb, PLWc) in FIG. 1.

The priority determination circuit 210 changes the priority level signal (PL[N:0]) included in the access request on the basis of the address signal (AD) included in the access request and outputs the priority level signal (PLW[N:0]). In addition, the priority determination circuit 210 outputs the priority level signal (PLT[N:0]) for controlling the band of the other masters on the basis of the address signal (AD) included in the access request.

Figure 5:
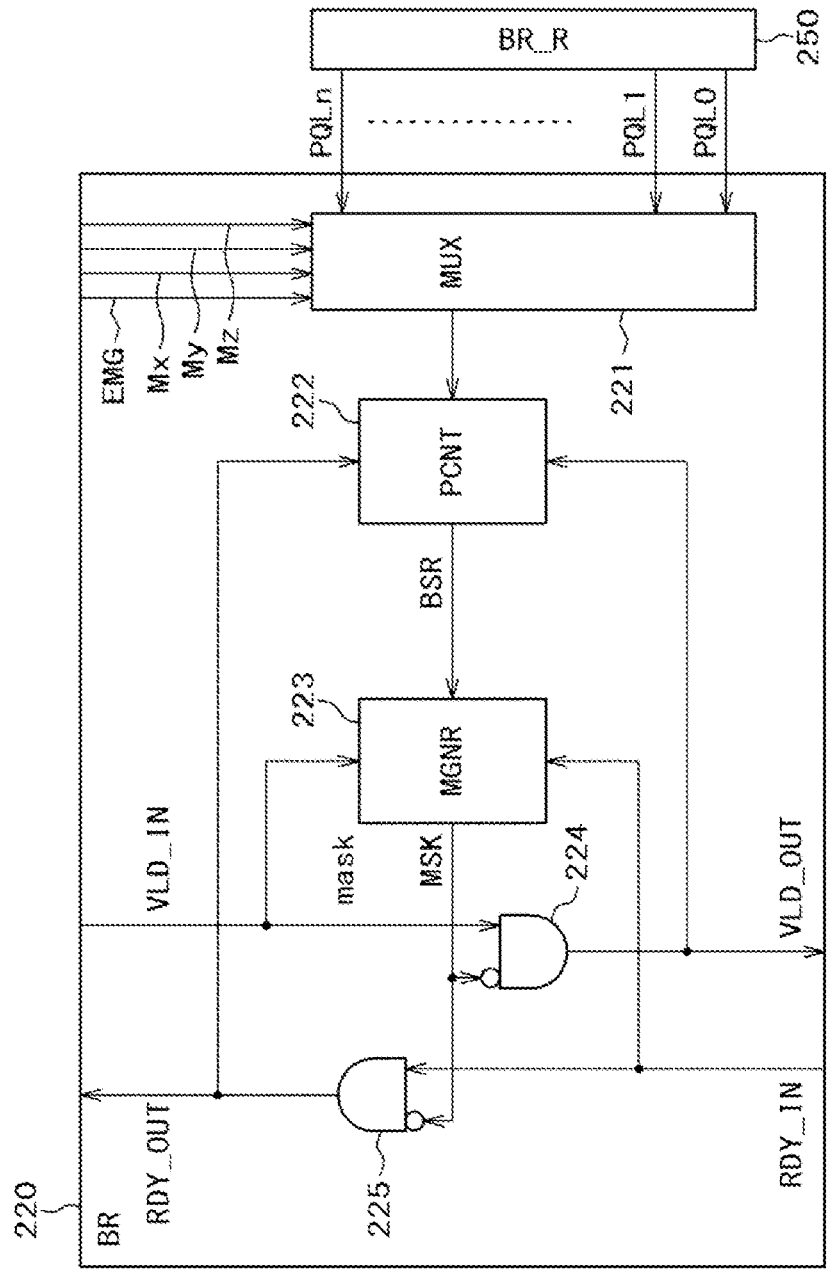
FIG. 5 is a block diagram illustrating a configuration of a band adjustment circuit and its periphery illustrated in FIG. 1.
Figure 6:
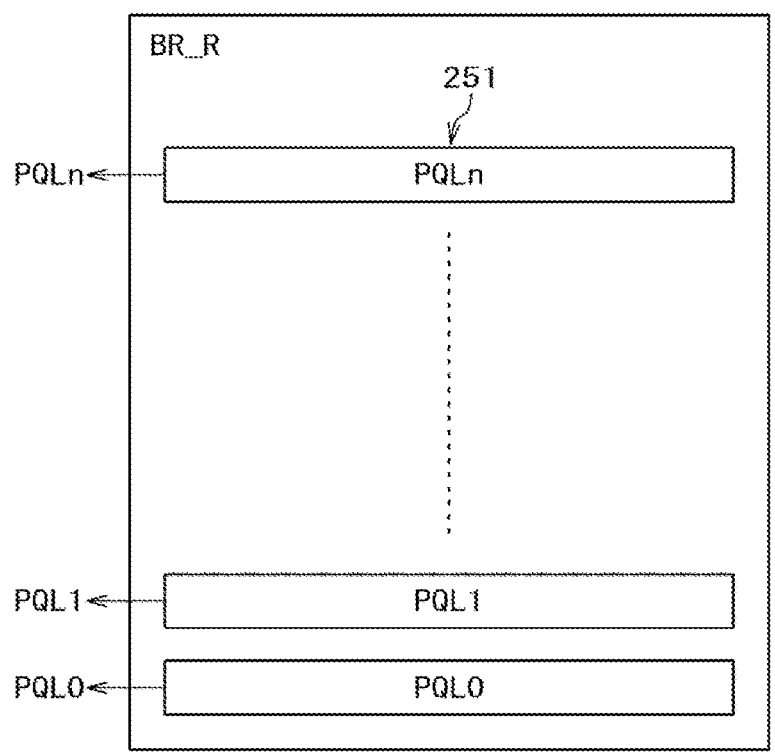
FIG. 6 is a diagram illustrating a configuration example of a band control register illustrated in FIG. 1.

Next, a configuration example of the band adjustment circuit 220 will be described with reference to FIGS. 5 and 6. FIG. 5 is a block diagram illustrating a configuration of the band adjustment circuit and its periphery. FIG. 6 is a diagram illustrating a configuration example of the band control register.

The band adjustment circuit 220 receives the priority level (PLW[N:0]) from the priority determination circuit 210 corresponding to the master (own master) from which the access request is received and the priority levels (PLT[N:0]) from the priority determination circuits 210 corresponding to other masters (other masters). Then, the band adjustment circuit 220 compares the priority levels, selects one of the priority levels, and performs band control on the basis of the priority level.

More specifically, in a case where the emergency signal (EMG) from the own master is at the low level, when the priority levels (PLT[N:0]) from the other masters are 1 or more, the band adjustment circuit 220 compares the input priority level (PLT[N:0]) of the own master with the priority levels (PLW[N:0]) of the other masters and selects the lowest priority level. When the priority levels (PLT[N:0]) from the other masters are 0, the priority level (PLW[N:0]) of the own master is selected. The band adjustment circuit 220 performs band control on the basis of the selected priority level.

When the emergency signal (EMG) from the own master is at the high level, the band adjustment circuit 220 selects the priority level (PLW[N:0]) of the own master. The band adjustment circuit 220 performs band control on the basis of the selected priority level (priority level (PLW[N:0]) of the own master).

The band adjustment circuit 220 performs band control of the number of request transfers per unit time on the basis of the selected own master priority level signal (PLW[N:0]) or other master priority level signal (PLT[N:0]) by masking a valid signal (VLD) and a ready signal (RDY).

Here, in the bus protocol in the semiconductor device 10, the master 100 always makes a data transfer request, but the actual data may be sent from the master 100 to the slave 300 or may be sent from the slave 300 to the master 100. A base of data transfer in this bus protocol is the protocol using a data signal, a valid signal (VLD), and a ready signal (RDY) as described below.

The valid signal (VLD) indicates that the transmitting side is presenting valid data in the data signal. The ready signal (RDY) indicates that the receiving side can receive the data of the data signal. Transmission and reception are established at the time point when the valid signal (VLD) and the ready signal (RDY) simultaneously go to the high level. Note that, in FIG. 5, a case where data is sent from the master 100 to the slave 300 will be described.

As illustrated in FIG. 5, the band adjustment circuit 220 includes a selection circuit (MUX) 221, a period counter (PCNT) 222, a mask generation circuit (MGNR) 223, an AND circuit 224, and an AND circuit 225.

As illustrated in FIG. 6, the band control register 250 includes (n+1) period registers (PQL0 to PQLn) 251. Here, n=1 to ($2^{N+1}-1$). The period register (PQL0) is a register that stores a period having a normal priority level (priority level value is 0). The period register (PQL1) is a register that stores a period having a priority level value of 1. The period register (PQLn) is a register that stores a period having a priority level value of n.

The selection circuit 221 selects one of the (n+1) period registers 251 on the basis of the emergency signal (EMG), the own master priority level signal (Mx), a first other master priority level signal (My), and a second other master priority level signal (Mz). Here, the own master priority level signal (Mx), the first other master priority level signal (My), and the second other master priority level signal (Mz) will be described.

In the band adjustment circuit 220a, the priority level signal (PLW[N:0]) from the priority determination circuit 210a is the own master priority level signal (Mx). The priority level signal (PLT[N:0]) from the priority determination circuit 210b is the first other master priority level signal (My). The priority level signal (PLT[N:0]) from the priority determination circuit 210c is the second other master priority level signal (Mz).

In the band adjustment circuit 220b, the priority level signal (PLW[N:0]) from the priority determination circuit 210b is the own master priority level signal (Mx). The priority level signal (PLT[N:0]) from the priority determination circuit 210a is the first other master priority level signal (My). The priority level signal (PLT[N:0]) from the priority determination circuit 210c is the second other master priority level signal (Mz).

In the band adjustment circuit 220c, the priority level signal (PLW[N:0]) from the priority determination circuit 210c is the own master priority level signal (Mx). The priority level signal (PLT[N:0]) from the priority determination circuit 210a is the first other master priority level signal (My). The priority level signal (PLT[N:0]) from the priority determination circuit 210b is the second other master priority level signal (Mz).

When the emergency signal (EMG) is at the high level (in the case of the emergency-time priority level (E-QoS)), the selection circuit 221 selects the period register 251 corresponding to the priority level value indicated by the priority level signal (Mx). When the own master is at the emergency-time priority level, interference from other masters is not received.

When the emergency signal (EMG) is at the low level (in the case of the normal-time priority level (N-QoS)), the selection circuit 221 compares the priority level signal (Mx) with the priority level signal (MyMz) and selects the period register as indicated in (a) to (c) below. Here, the priority level signal (MyMz) is the smaller one of the priority levels indicated by the priority level signal (My) and the priority level signal (Mz), and is "1" or more. That is, the selection is made such that the priority level is equal to or lower than the priority level indicated by the other master priority level signal (MyMz).

(a) When the priority level indicated by the priority level signal (Mx) is higher than the priority level indicated by the priority level signal (MyMz), the period register 251 corresponding to the priority level value indicated by the priority level signal (MyMz) is selected.

(b) When the priority level indicated by the priority level signal (Mx) and the priority level indicated by the priority level signal (MyMz) are the same, the period register 251 corresponding to the priority level value indicated by the priority level signal (Mx) or the priority level signal (MyMz) is selected.

(c) When the priority level indicated by the priority level signal (Mx) is lower than the priority level indicated by the priority level signal (MyMz), the period register 251 corresponding to the priority level value indicated by the priority level signal (Mx) is selected.

Note that when the priority level signal (MyMz) from the other masters is 1 or more, the other masters are at the emergency-time priority level (E-QoS). When the priority level signal (MyMz) is 0, the other masters are at the normal-time priority level (N-QoS). The selection circuit 221 can make a determination without an emergency signal (EMG) from the other masters.

When both the priority levels indicated by the priority level signal (My) and the priority level signal (Mz) are "0", the priority level signal (MyMz) is "0". In this case, the period registers (PQL0 to PQLn) corresponding to the priority level indicated by the priority level signal (Mx) are selected. The other masters are also at the normal-time priority level (N-QoS) and do not interfere.

The period counter 222 includes, for example, a down counter that decreases (−1) the preset number every time the number of pulses of the clock is counted. The value (mask period) stored in the period register selected by the selection circuit 221 is preset (set) in the period counter 222 at the timing when a valid output signal (VLD OUT) and a ready output signal (RDY_OUT) go to the high level. The period counter 222 sets a bus stop request signal (BSR) to the high level when the count value is 1 or more, and sets the bus stop request signal (BSR) to the low level when the count value is 0. The period counter 222 counts a period for masking a valid input signal (VLD_IN) and a ready input signal (RDY_IN).

When the bus stop request signal (BSR), the valid input signal (VLD_IN), and the ready input signal (RDY_IN) are at the high level, the mask generation circuit (MGNR) 223 sets a mask signal (MSK) to the high level in the next cycle. When the mask signal (MSK) is at the high level, the AND circuit 224 masks the valid input signal (VLD_IN) and sets the valid output signal (VLD OUT), which is the output signal thereof, to the low level. When the mask signal (MSK) is at the low level, the AND circuit 224 outputs the valid input signal (VLD_IN). When the mask signal (MSK) is at the high level, the AND circuit 225 masks the ready input signal (RDY_IN) and sets the ready output signal (RDY_OUT), which is the output signal thereof, to the low level. When the mask signal (MSK) is at the low level, the AND circuit 225 outputs the ready input signal (RDY_IN).

Figure 7:
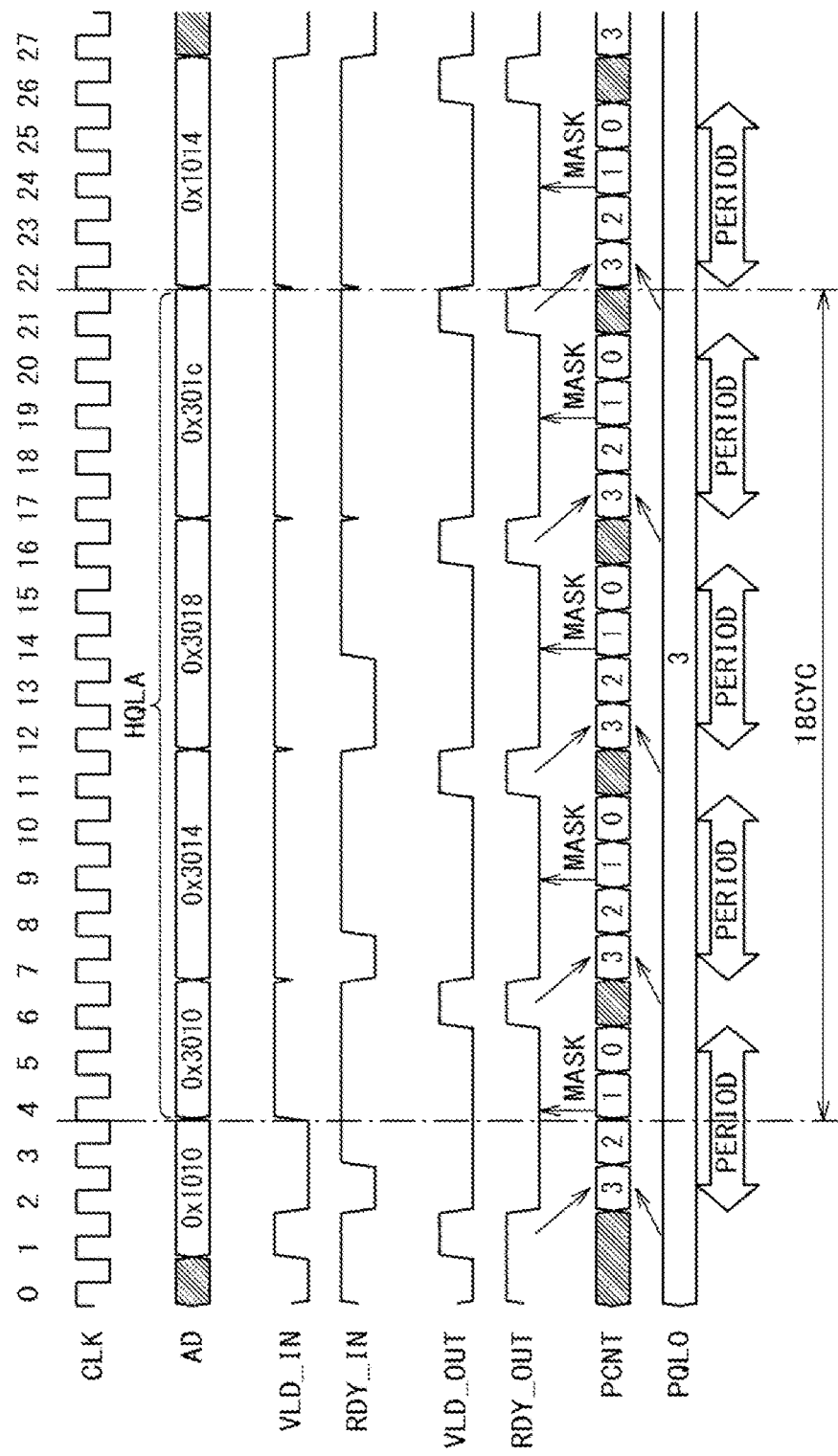
FIG. 7 is a timing chart illustrating an operation example in a case where there is no band control in a high priority level area.
Figure 8:
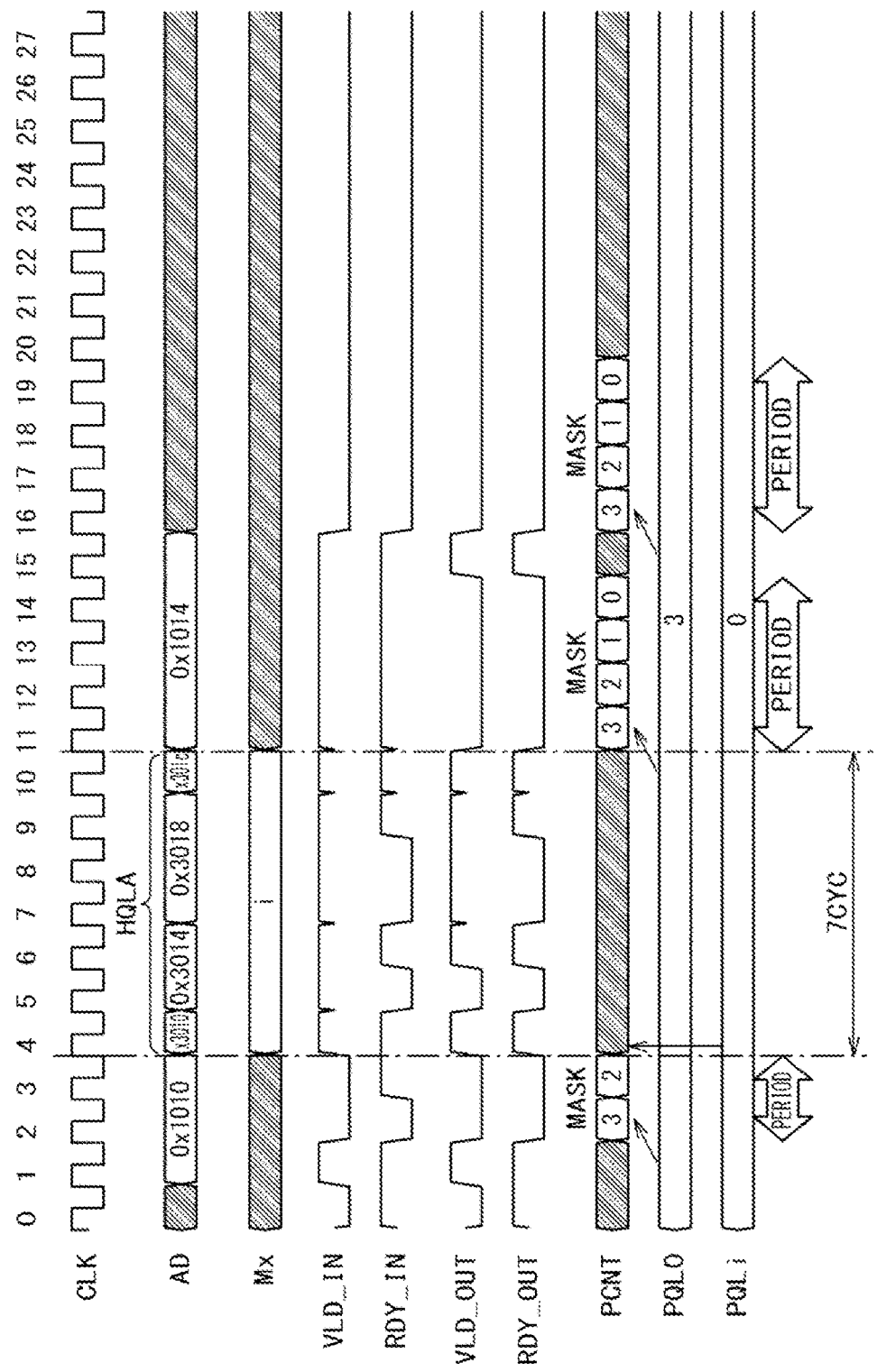
FIG. 8 is a timing chart illustrating an operation example in a case where there is band control of an own master in a high priority level area.
Figure 9:
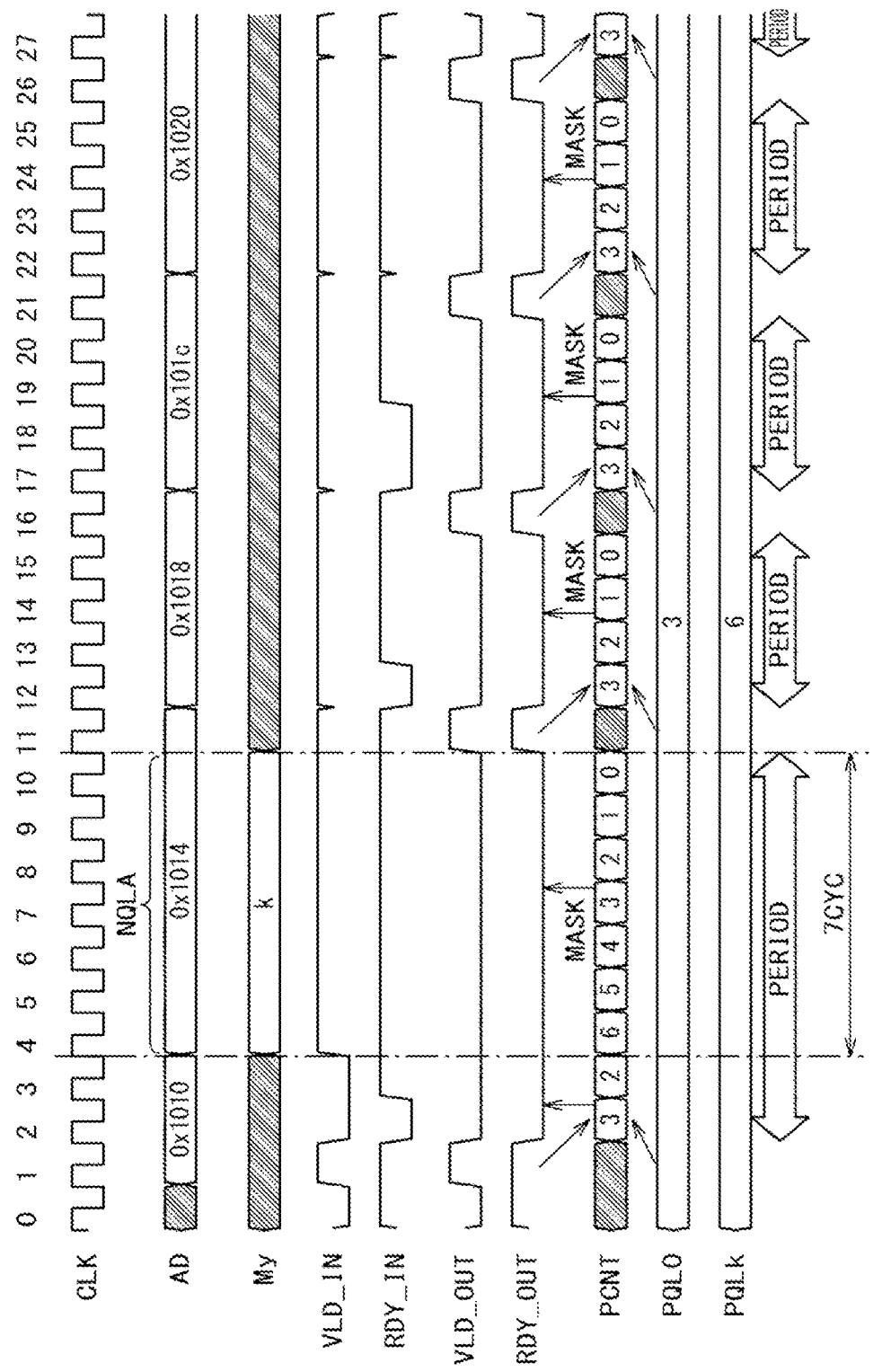
FIG. 9 is a timing chart illustrating an operation example in a case where there is band control of another master in a high priority level area.

The band control operation will be described with reference to FIGS. 7 to 9. FIG. 7 is a timing chart illustrating an operation example in a case where band limitation is not relaxed in a high priority level area. FIG. 8 is a timing chart illustrating an operation example in a case where band limitation of the own master is relaxed in a high priority level area. FIG. 9 is a timing chart illustrating an operation example in a case where band limitation of other masters is enhanced in a low priority level area.

In FIGS. 7 to 9, AD=0x1010 to 0x1020 are a normal priority level area (NQLA). In addition, AD=0x3010 to 0x301c are a high priority level area (HQLA).

In FIG. 7, the band limitation is not relaxed in the high priority level area (HQLA) similarly to the normal priority level area (NQLA). That is, the priority level included in the access request is "0", and the priority level register (QLW) of the priority control register 240=0. Thus, the priority level (PLW) of the own master is "0", and the period register (PQL0) of the band control register 250 is selected. In addition, as illustrated in FIG. 7, PQL0=3, and the mask period (interval period) is four cycles (CYC).

Thus, even in the case of access to the high priority level area (HQLA), a uniform interval period (PERIOD) is inserted between accesses. As a result, the four accesses in the high priority level area (HQLA) take 18 cycles (18CYC).

In FIG. 8, the band limitation of the own master is relaxed in the high priority level area (HQLA). That is, the priority level included in the access request is "i" or the priority level register (QLW) of the priority control register 240=i, and the priority level (PLW) of the own master is "i". Where i>0. Thus, Mx=i, and a period register (PQLi) of the band control register 250 is selected. As illustrated in FIG. 8, PQLi=0, and the mask period (interval period) is zero cycles (0CYC). Note that, in the normal priority level area (NQLA), PQL0=3, and the mask period (interval period) is four cycles (4CYC) as in FIG. 7. Note that, in the access to AD=0x1010, since the subsequent access is the high priority level area (HQLA) and the access starts early, the mask period ends in two cycles.

Thus, no interval is set while the own master accesses the high priority level area (HQLA). As a result, the four accesses in the high priority level area (HQLA) take seven cycles (7CYC).

In FIG. 9, while the own master accesses the high priority level area (HQLA), the band limitation of the other masters is enhanced. That is, the priority level register (QLT) of the priority control register 240=k, and the priority level (PLW) of the own master is "i". Where i>k>0. Thus, Mx=i and My=k, and a period register (PQLk) of the band control register 250 is selected. As illustrated in FIG. 9, PQLk=6, and the mask period (interval period) is seven cycles (7CYC). In addition, in the normal priority level area (NQLA), PQL0=3, and the mask period (interval period) is four cycles (CYC) as in FIG. 7. Note that, in the access to AD=0x1010 by the other masters, since the subsequent access by the own master is the high priority level area (HQLA) and the access starts early, the mask period ends in two cycles.

Thus, the access to AD=0x1014 by the other masters is the access during the access by the own master to the high priority level area (HQLA), and the interval period is extended. As a result, the access to AD=0x1014 by the other masters takes eight cycles (8 CYC). Note that "7CYC" in FIG. 9 is a mask period.

Figure 10:
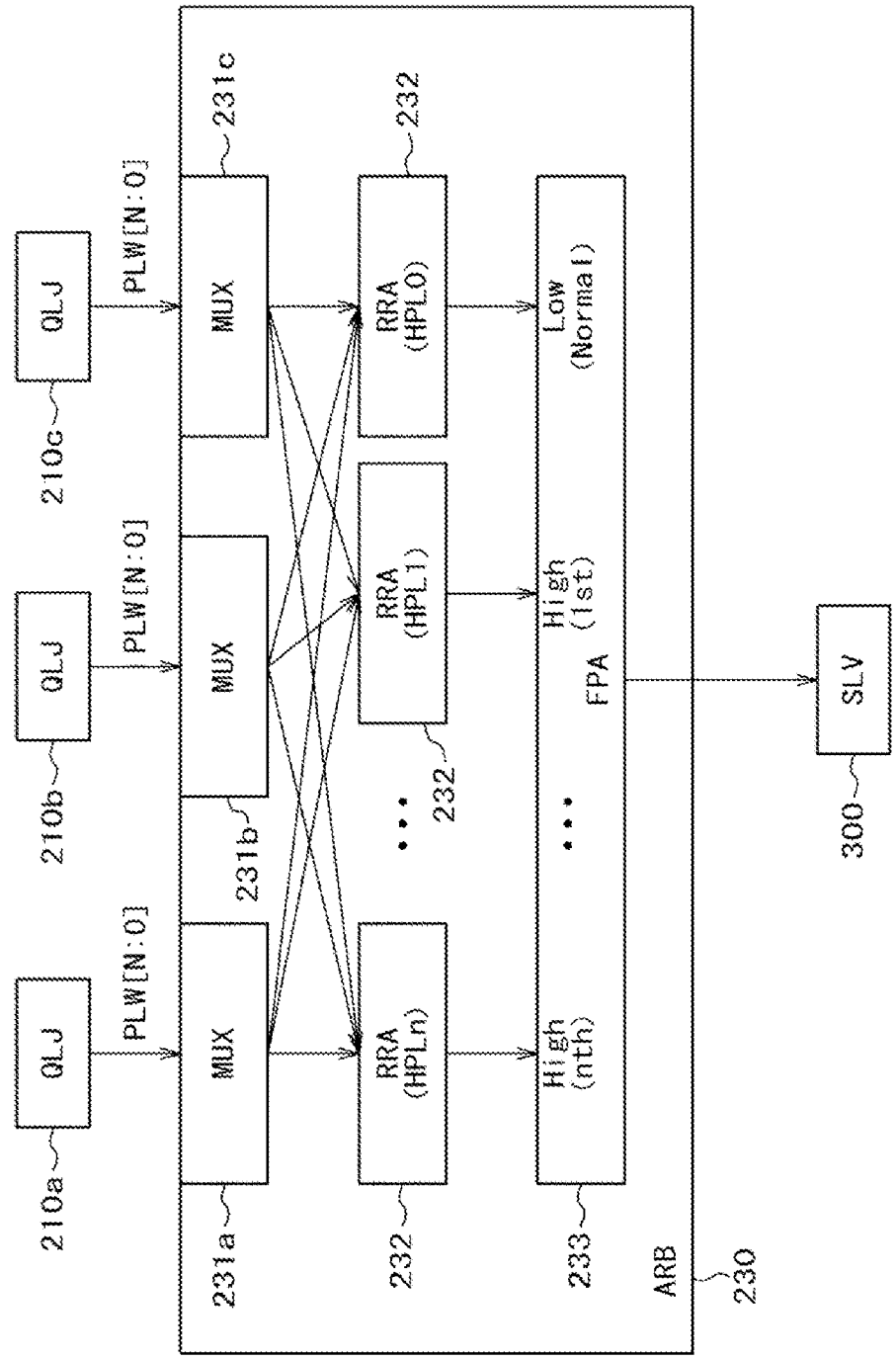
FIG. 10 is a block diagram illustrating a configuration of a bus arbitration circuit illustrated in FIG. 1.

A configuration of the bus arbitration circuit 230 will be described with reference to FIG. 10. FIG. 10 is a block diagram illustrating a configuration of an arbitration circuit.

The bus arbitration circuit 230 receives the priority level signals (PLW[N:0]) from the priority determination circuits 210a, 210b, and 210c. In addition, the bus arbitration circuit 230 arbitrates the access request using the received priority level signals (PLW[N:0]). An access request having a large priority level value is preferentially arbitrated.

Therefore, the bus arbitration circuit 230 includes decode circuits (MUX) 231a, 231b, and 231c, (n+1) arbitration circuits (RRA) 232, and an arbitration circuit (FRA) 233. The arbitration circuit (RRA) 232 includes a round robin-type arbitration circuit for a normal priority level (NPL0), a high priority level 1 (HPL1), . . . , and a high priority level n (HPLn). The arbitration circuit (FRA) 233 is a fixed priority-type arbitration circuit.

The decode circuits (MUX) 231a, 231b, and 231c decode the priority level signal (PL[N:0]), and select the arbitration circuit (RRA) 232 corresponding to the priority level. That is, the arbitration circuit (RRA) 232 performs arbitration among the same priority levels in a round-robin manner. The arbitration circuit (FRA) 233 prioritizes outputs of the (n+1) arbitration circuits (RRA) 232 in a fixed priority manner.

Figure 11:
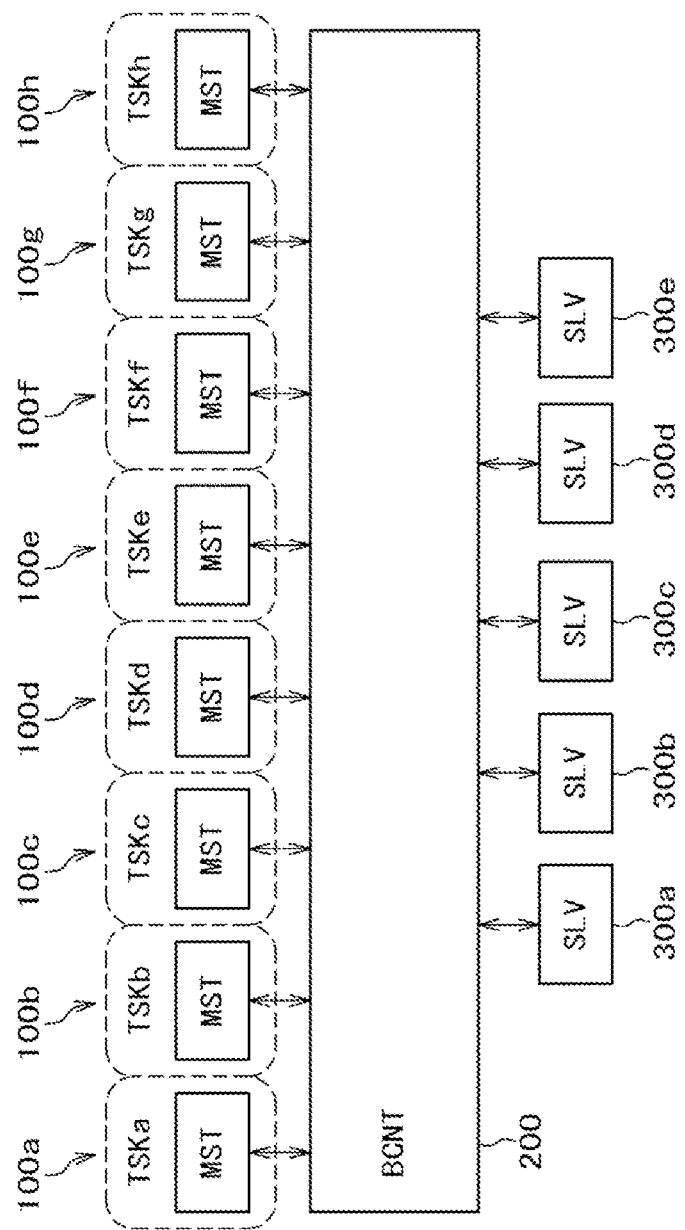
FIG. 11 is a diagram illustrating a bus configuration according to the embodiment and a comparative example.
Figure 12:
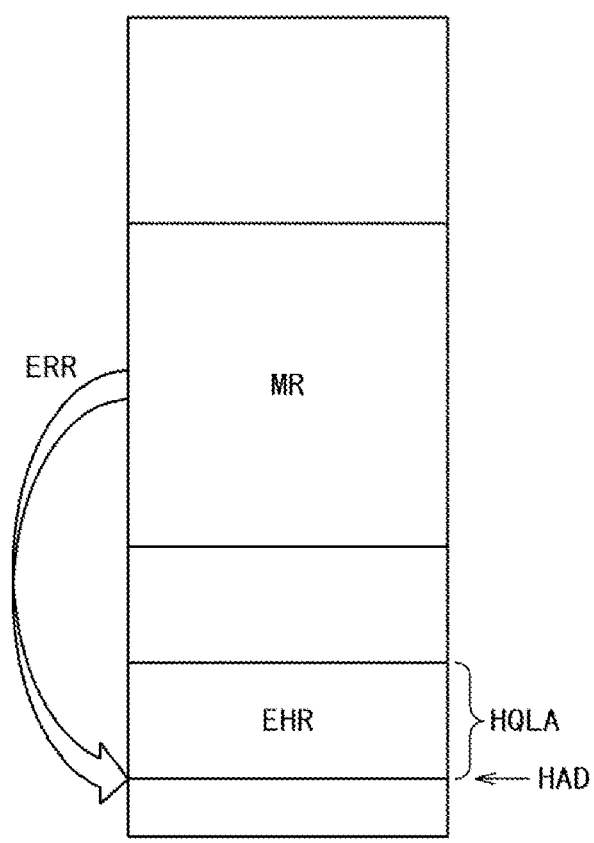
FIG. 12 is a diagram illustrating a memory map of a master.
Figure 13:
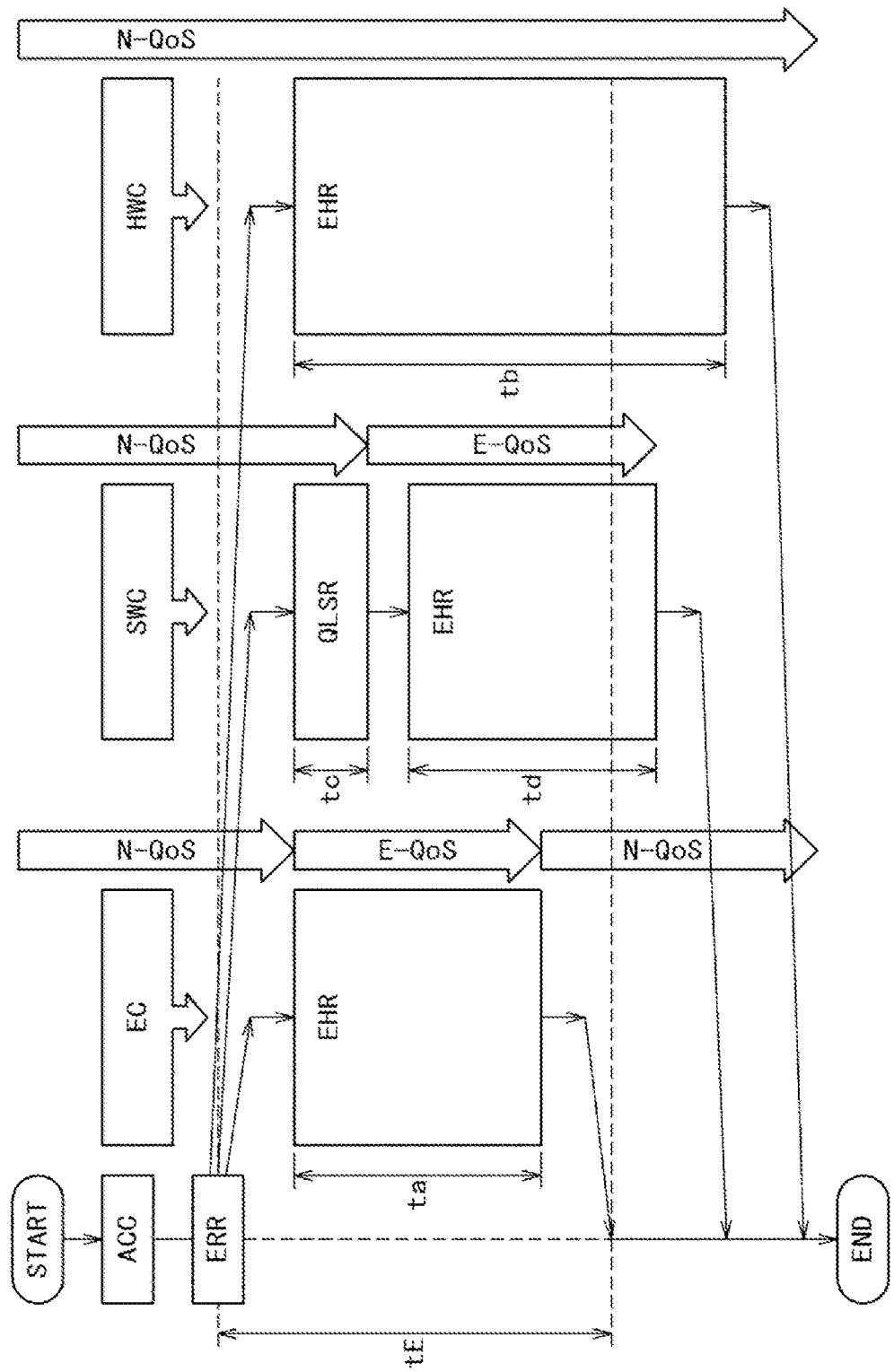
FIG. 13 is a diagram illustrating time of error processing according to the embodiment and a comparative example.

In order to make the embodiment clearer, problems in a bus control circuit having a configuration (comparative example) different from that of the embodiment will be described with reference to FIGS. 11 to 13. FIG. 11 is a diagram illustrating a bus configuration according to the embodiment and the comparative example. FIG. 12 is a diagram illustrating a memory map of a master. FIG. 13 is a diagram illustrating time of error processing according to the embodiment and the comparative example.

As illustrated in FIG. 11, control tasks (TSKa to TSKh) are allocated to masters 100a to 100h, respectively. The control tasks (TSKa to TSKh) have different priority level. When an error occurs, error processing is performed for each of the masters 100a to 100h.

When the management of the priority level is not appropriately performed, the band is limited or the priority is lowered even in urgent processing (for example, error processing). That is, when the management of the priority level is not appropriately performed in the bus control circuit 200, there is a possibility that the error processing is not completed within a predetermined time.

For example, as illustrated in FIG. 12, when an error (ERR) occurs while a certain master is performing processing by a main routine (MR) in a normal state, error processing is performed by an error processing routine (EHR) stored in a handler address (HAD).

As illustrated in FIG. 13, in a case where the setting change of the priority level of the master is not performed and the error is left to hardware control (HWC) with the normal-time priority level (N-QoS), when the priority level of the master is low, in the worst case, waiting occurs at the time of access contention with other masters. This is because, in the case of the control in ARM (registered trademark) CoreLink QoS-400 Network Interconnect Advanced Quality of Service, even in the error processing, the priority level is changed according to the access situation from the past to the present, so that the priority level does not change steeply. Hence, the processing of the error processing routine (EHR) may not be completed within expected time (tE) (tb>tE). Here, tb is processing time of the error processing routine (EHR).

As illustrated in FIG. 13, even in a case where the normal-time priority level (N-QoS) is changed to the emergency-time priority level (E-QoS) by a processing routine (QLSR) for changing the setting of the priority level register by software control (SWC), the processing routine (QLSR) itself is executed under the normal-time priority level (N-QoS), and thus a predetermined processing time (tc) is spent by the processing routine (QLSR). Hence, the processing of the error processing routine (EHR) may not be completed within expected time (tE) ((tc+td)>tE). Here, td is processing time of the error processing routine (EHR).

Error processing using the bus control circuit in the embodiment will be described with reference to FIGS. 12 and 13.

In the control (EC) of the present embodiment, as illustrated in FIG. 12, an address range in which an urgent code such as the error processing routine (EHR) is stored is set as a high priority level area (HQLA). When an error (ERR) occurs, access to the handler address (HAD) occurs, and access to the high priority level area (HQLA) is detected. Then, the normal-time priority level (N-QoS) is automatically changed to the emergency-time priority level (E-QoS).

In addition, the priority level of a master other than the master that accesses the high priority level area (HQLA) is lowered. Subsequently, the bus band limitation of the own master is relaxed, and the bus band limitation of the other masters is enhanced. Thus, it is possible to complete the processing of the error processing routine (EHR) within the expected time (tE) (ta<tE). Here, ta is processing time of the error processing routine (EHR).

According to the embodiment, the one or a plurality of effects described below are obtained.

(1) In an emergency, it is possible to switch to QoS (band control, priority control) different from a normal time.

(2) It is possible to detect a transaction for data stored in a handler address when an abnormality such as a system error occurs, release the band limitation of the access of the master (CPU or the like) that executes the processing (error processing) of the abnormality, and limit the band of other masters.

(3) It is possible to perform an emergency data access for which priority is given to latency with low latency.

(4) When an error occurs, quick error processing can be performed.

<Modification>

Hereinafter, a representative modification of the embodiment will be exemplified. In the following description of the modification, the same reference signs as those in the above-described embodiment can be used for portions having the same configurations and functions as those described in the above-described embodiment. For the description of such portions, the description in the above-described embodiment can be appropriately used within a scope not technically contradictory. In addition, a part of the above-described embodiment and whole or a part of the modification can be applied in combination as appropriate within a scope not technically contradictory.

Figure 14:
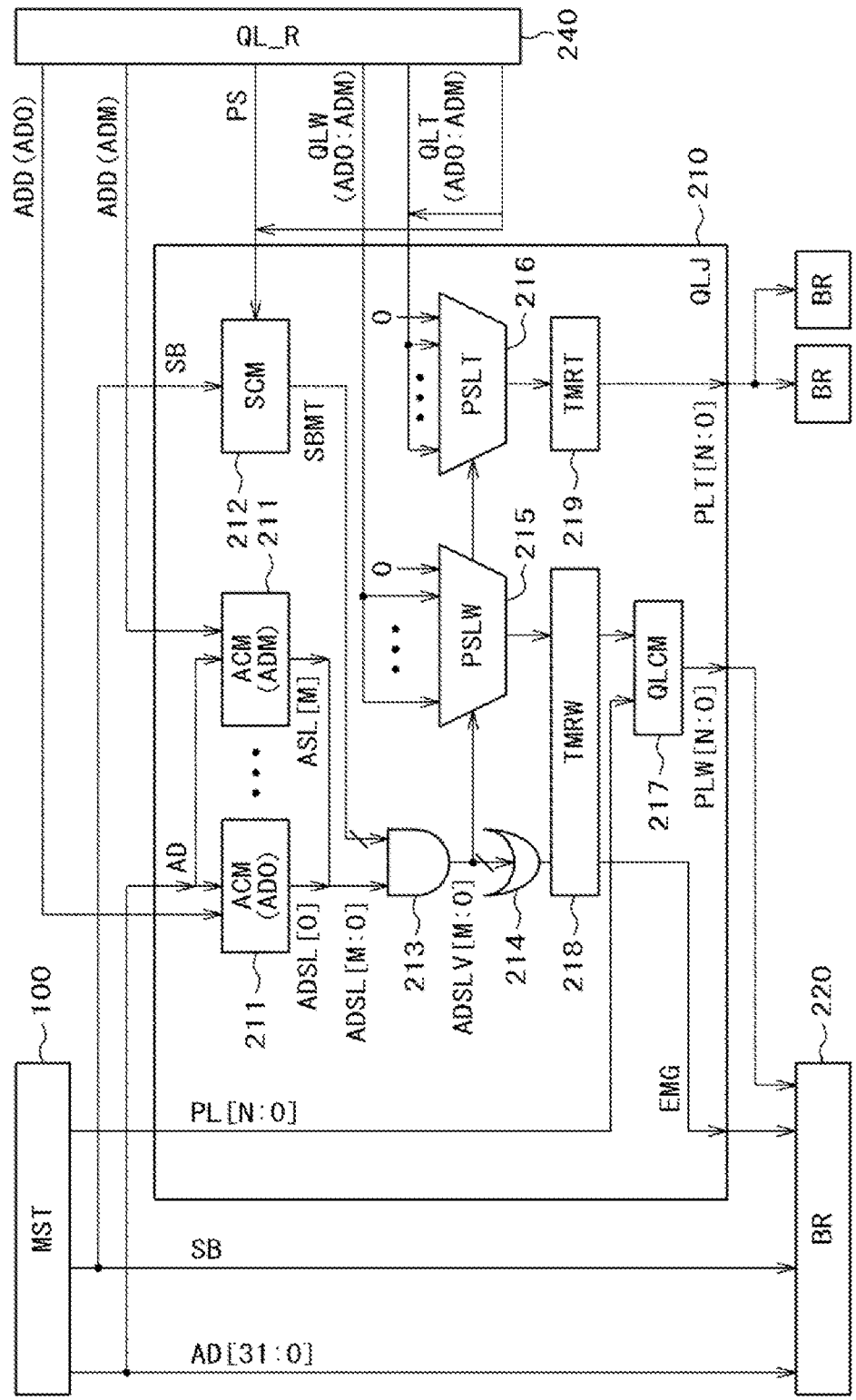
FIG. 14 is a block diagram illustrating a modification of the configuration of the priority determination circuit and its periphery illustrated in FIG. 1.
Figure 15:
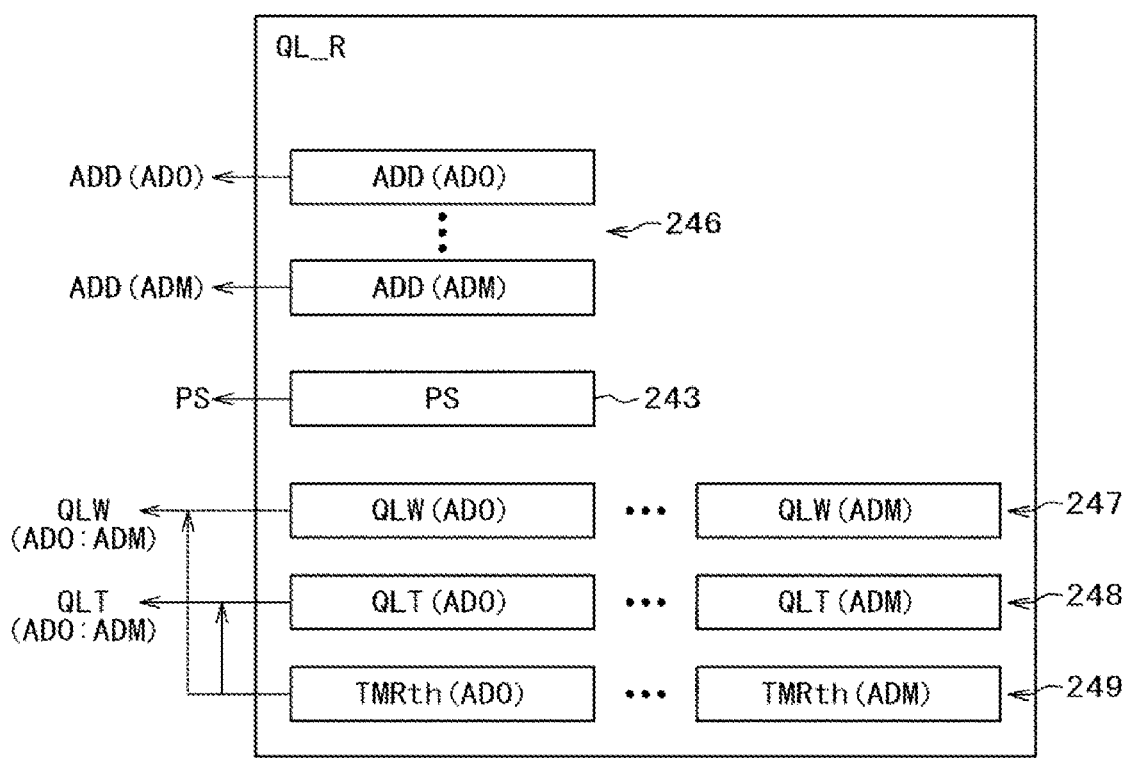
FIG. 15 is a diagram illustrating a modification of a configuration of the priority control register illustrated in FIG. 1.

A modification of the priority determination circuit 210 will be described with reference to FIGS. 14 and 15. FIG. 14 is a block diagram illustrating a modification of the configuration of the priority determination circuit and its periphery illustrated in FIG. 1. FIG. 15 is a diagram illustrating a modification of a configuration of the priority control register illustrated in FIG. 1.

In the priority determination circuit 210 of the present configuration example, an urgent access request is determined by a designated period from a time point when access to a specific address is detected. The specific address is, for example, the handler address (HAD) for the error processing illustrated in FIG. 12, and the period is, for example, the error processing time.

The priority determination circuit 210 determines an address (high priority level address (HQAD)) having a high priority level from the address signal (AD) and the sideband signal (SB), and sets (updates) the priority level for each high priority level address (HQAD).

As illustrated in FIG. 14, the priority determination circuit 210 includes (M+1) comparison circuits (ACM) 211, a comparison circuit (SCM) 212, (M+1) AND circuits 213, a selector (PSLW) 215, an OR circuit 214, a selector (PSLT) 216, a comparison circuit (QLCM) 217, a timer (TMRW) 218, and a timer (TMRT) 219.

As illustrated in FIG. 15, the priority control register 240 includes (M+1) address registers (ADD(AD0) to ADD (ADM)) 246, a sideband register (PS) 243, (M+1) own master priority level registers (QLW) 247, (M+1) other master priority level registers (QLT) 248, and (M+1) timer threshold registers (TMRth) 249.

In the embodiment, an address area having a high priority level is set, but in the present modification, a specific address is set. In the embodiment, the own master priority level registers and the other master priority level registers are associated with address areas, but in the present modification, the own master priority level registers and the other master priority level registers are associated with specific addresses.

Among the areas accessed by the master 100, (M+1) high priority level addresses (HQAD) can be set, and these high priority level addresses (HQAD) are set as addresses (AD0 to ADM).

The sideband register 243 is a register for setting a specific master, and identification information (BMID) is set. The own master priority level register (QLW(AD0)) 247 is a priority level register for the address (AD0), and the priority level of the address (AD0) is set. The own master priority level register (QLW(ADM)) 247 is a priority level register for the address (ADM), and the priority level of the address (ADM) is set.

The other master priority level register (QLT(AD0)) 248 is a priority level register for the address (AD0), and the priority level of the address (AD0) is set. The other master priority level register (QLT(ADM)) 248 is a priority level register for the address (ADM), and the priority level of the address (ADM) is set.

The (M+1) comparison circuits 211 determine whether the address signal (AD) is the high priority level address (HQAD). The comparison circuit (ACM(AD0)) 211 for the address (AD0) determines whether the address signal (AD) is the address (AD0). The comparison circuit (ACM(ADM)) 211 for the address (ADM) determines whether the address signal (AD) is the address (ADM).

The comparison circuit 211 for the address (AD0) compares the address signal (AD) with the address stored in an address register 246 for the address (AD0). When the address signal (AD) matches the address of the address register 246 for the address (AD0), the comparison circuit 211 for the address (AD0) sets an address selection signal (ADSL[0]) to the high level.

The comparison circuit 211 for the address (ADM) compares the address signal (AD) with the address stored in an address register 246 for the address (ADM). When the address signal (AD) matches the address of the address register 246 for the address (ADM), the comparison circuit 211 for the address (ADM) sets an address selection signal (ADSL[M]) to the high level.

The address selection signal (ADSL[0]) to the address selection signal (ADSL[M]) are collectively referred to as an address selection signal (ADSL[M:0]). That is, the address selection signal (ADSL[M:0]) is a (M+1)-bit signal.

The comparison circuit 212 determines whether the master 100 is a specific master. The comparison circuit 212 compares the identification information (BMID) included in the sideband signal (SB) with the identification information (BMID) stored in the sideband register (PS), and when the identification information matches the identification information, for example, sets a match signal (SBMT) to the high level.

The AND circuit 213 performs logical conjunction of each address selection signal (ADSL[M:0]) and the match signal (SBMT) and outputs (M+1)-bit address selection valid signals (ADSLV[M:0]). In a case where the match signal (SBMT) is at the high level, when any of the address selection signals (ADSL[M:0]) is at the high level, any of the address selection valid signals (ADSLV[M:0]) is at the high level.

The OR circuit 214 performs logical disjunction of (M+1)-bit address selection valid signals (ADSLV[M:0]). The OR circuit 214 outputs the high level when any of the address selection valid signals (ADSLV[M:0]) is at the high level. When a specific master accesses the high priority level address (HQAD), an emergency signal (EMG) goes to the high level. The emergency signal (EMG) goes to the high level when the address signal (AD) is the high priority level address (HQAD), and indicates that the priority level signal (PL[N:0] is at the emergency-time priority level (E-QoS). When the emergency signal (EMG) is at the low level, it indicates that the priority level signal (PL[N:0]) is at a normal-time priority level (N-QoS).

The selector 215 selects the priority level stored in the own master priority level registers (QLW(AD0) to QLW(ADM)) 247 according to the address selection valid signal (ADSLV[M:0]). When all the address selection valid signals (ADSLV[M:0]) are at the low level, "0" is selected.

In addition, the selector 215 selects a timer threshold stored in the timer threshold registers (TMRth(AD0) to TMRth(ADM)) 249 according to the address selection valid signal (ADSLV[M:0]).

The selector 216 selects the priority level stored in the other master priority level register (QLT(AD0) to QLT(ADM)) 248 according to the address selection valid signals (ADSLV[M:0]) and outputs the priority level as the other master priority level signal (PLT[N:0]). When all the address selection valid signals (ADSLV[M:0]) are at the low level, "0" is selected. That is, when the address signal (AD) is not the high priority level address (HQAD), PLT[N:0] becomes 0.

In addition, the selector 216 selects a timer threshold stored in the timer threshold registers (TMRth(AD0) to TMRth(ADM)) 249 according to the address selection valid signal (ADSLV[M:0]).

The timer 218 outputs the priority level selected by the selector 215 and the emergency signal, which is the output of the OR circuit 214, during the period of the threshold selected by the selector 215.

The timer 219 outputs the priority level selected by the selector 216 during the period of the threshold selected by the selector 216.

The comparison circuit 217 compares the priority level indicated by the priority level signal (PL[N:0]) with the priority level that is the output of the timer 218, and outputs the higher priority level as the own master priority level signal (PLW[N:0]).

The priority determination circuit 210 changes the priority level signal (PL[N:0]) included in the access request on the basis of the address signal (AD) included in the access request and outputs the priority level signal (PLW[N:0]) and outputs the priority level signal (PLT[N:0]) for controlling the band of other masters.

In a case where processing with high priority is performed over a plurality of address areas, in the embodiment, it is necessary to set each address area and priorities of the areas. In the present modification, a first address of processing with high priority is set, a designated period is measured by a timer when access to the address is detected, and the priority level is increased during the period. The address is, for example, a handler address when an error occurs. According to the present modification, setting can be performed more easily than setting of a plurality of address areas and respective priorities in the embodiment.

Although the disclosure made by the present discloser has been specifically described above on the basis of the embodiment, the present disclosure is not limited to the above-described embodiment, and it goes without saying that various changes may be made without departing from the gist of the present disclosure.

For example, in the embodiment, the example in which the urgent access request is determined on the basis of the address signal and the sideband signal has been described, but the urgent access request may be determined on the basis of the address signal without using the sideband signal.

In addition, in the embodiment, the example of determining the priority level value on the basis of the identification information (BMID) included in the sideband signal (SB) has been described, but information indicating a special mode may be included in the sideband signal (SB) and the priority level value may be determined on the basis of this information. Here, the special mode is, for example, a supervisor mode, a debug mode, or a secure mode.

What is claimed is:

1. A semiconductor device comprising:
a plurality of masters;
a slave; and
a bus control circuit that controls access to the slave shared by the plurality of masters,
wherein the bus control circuit includes a plurality of priority determination circuits corresponding to the plurality of masters,
wherein the priority determination circuit is configured to, when receiving an urgent access from a corresponding master, i) change a priority level signal included in an access request from the corresponding master and allocate a high priority level for emergency, and ii) allocate a low priority level to a master other than the corresponding master,
wherein the bus control circuit further includes:
a plurality of band adjustment circuits corresponding to the plurality of masters; and
a bus arbitration circuit corresponding to the slave,
wherein the band adjustment circuits are configured to control a bus band to be allocated to access from a corresponding master on a basis of priority level signals input from the plurality of priority determination circuits, and
wherein the bus arbitration circuit is configured to arbitrate a priority order of each access on a basis of the priority level signals input from the plurality of priority determination circuits.

2. The semiconductor device according to claim 1, wherein the urgent access is defined by access to an address area designated by a start address and an end address.

3. The semiconductor device according to claim 2, wherein the priority determination circuit is configured to, when access by one master among the plurality of masters is input, receive an identification signal for identifying from which master the access is made, the identification signal being included in the access request, and identify access by a specific master among the plurality of masters.

4. The semiconductor device according to claim 1, wherein the urgent access is defined by a designated time from a time point when access to a specific address is detected.

5. The semiconductor device according to claim 1, wherein the urgent access is defined by a signal indicating that the urgent access is a request from a special master included in an access request.

6. The semiconductor device according to claim 5, wherein the special master is a master that transitions to a mode having a special authority by register setting or a master having a unique attribute.

7. The semiconductor device according to claim 1, wherein the band adjustment circuit is configured to:
- receive a first priority level signal from a first priority determination circuit corresponding to a first master from which a request is received and a second priority level signal from a second priority determination circuit corresponding to a second master other than the first master, and
- compare a first priority level indicated by the first priority level signal with a second priority level indicated by the second priority level signal, select one of the first and second priority levels, and perform band control on a basis of the selected one of the first and second priority levels.

8. The semiconductor device according to claim 7, wherein the band adjustment circuit is configured to:
- when not receiving the urgent access from the first master and when the second priority level of the second master is 1 or higher, compare the first priority level of the first master with the second priority level of the second master and select a lowest priority level of the first and second priority levels,
- when the second priority level of the second master is 0, select the first priority level of the first master, and
- when receiving the urgent access from the first master, select the first priority level of the first master.

\* \* \* \* \*